US008854665B2

(12) United States Patent  
Muranaka

(10) Patent No.: US 8,854,665 B2  
(45) Date of Patent: Oct. 7, 2014

(54) INFORMATION PROCESSING SYSTEM, REGISTRATION DEVICE, AND COMPUTER READABLE MEDIUM FOR IDENTIFYING A USER OF A PRINTER

(75) Inventor: Hiroaki Muranaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 93 days.

(21) Appl. No.: 13/363,728

(22) Filed: Feb. 1, 2012

(65) Prior Publication Data

US 2013/0070288 A1 Mar. 21, 2013

(30) Foreign Application Priority Data

Sep. 20, 2011 (JP) ................................. 2011-204660

(51) Int. Cl.
*G06F 3/12* (2006.01)
(52) U.S. Cl.
CPC ............ *G06F 3/1204* (2013.01); *G06F 3/1288* (2013.01); *G06F 3/1239* (2013.01)
USPC ....... 358/1.15; 358/1.13; 358/1.14; 358/1.16; 358/1.18
(58) Field of Classification Search
None
See application file for complete search history.

(56) References Cited

U.S. PATENT DOCUMENTS

| | | | |
|---|---|---|---|
| 2005/0162684 A1* | 7/2005 | Brown et al. | 358/1.15 |
| 2007/0229873 A1* | 10/2007 | Kato | 358/1.14 |
| 2008/0295162 A1* | 11/2008 | Wagner et al. | 726/10 |
| 2009/0225366 A1* | 9/2009 | Emori | 358/1.15 |
| 2010/0171973 A1* | 7/2010 | Kimura | 358/1.14 |
| 2012/0081740 A1* | 4/2012 | Takagi et al. | 358/1.15 |
| 2012/0227098 A1* | 9/2012 | Obasanjo et al. | 726/8 |

FOREIGN PATENT DOCUMENTS

JP  A-2004-96161  3/2004

* cited by examiner

*Primary Examiner* — Miya J Cato
(74) *Attorney, Agent, or Firm* — Oliff PLC

(57) ABSTRACT

An information processing system includes following elements. A first management device manages, for each user, information on a function of a printer that the user is permitted to use therein. A second management device accepts registration of a virtual printer for a set of a printer and a function used in the printer, and manages the registered virtual printer. A registration device registers a virtual printer in the second management device. The registration device identifies a user and a printer regarding a print request, acquires a function that the identified user is permitted to use in the identified printer from the first management device, and registers a virtual printer for a set of the identified printer and the acquired function in association with the identified user. The second management device processes, upon receiving a print instruction from the user, the print instruction based on the corresponding printer and function.

15 Claims, 13 Drawing Sheets

FIG. 2

| USER ID | DOUBLE-SIDED PRINTING | COLOR PRINTING | STAPLE | HOLE PUNCH |
|---|---|---|---|---|
| U0001 | NOT PERMITTED | PERMITTED | PERMITTED | PERMITTED |
| U0002 | PERMITTED | PERMITTED | NOT PERMITTED | PERMITTED |
| U0003 | PERMITTED | NOT PERMITTED | PERMITTED | PERMITTED |
| | | | | |

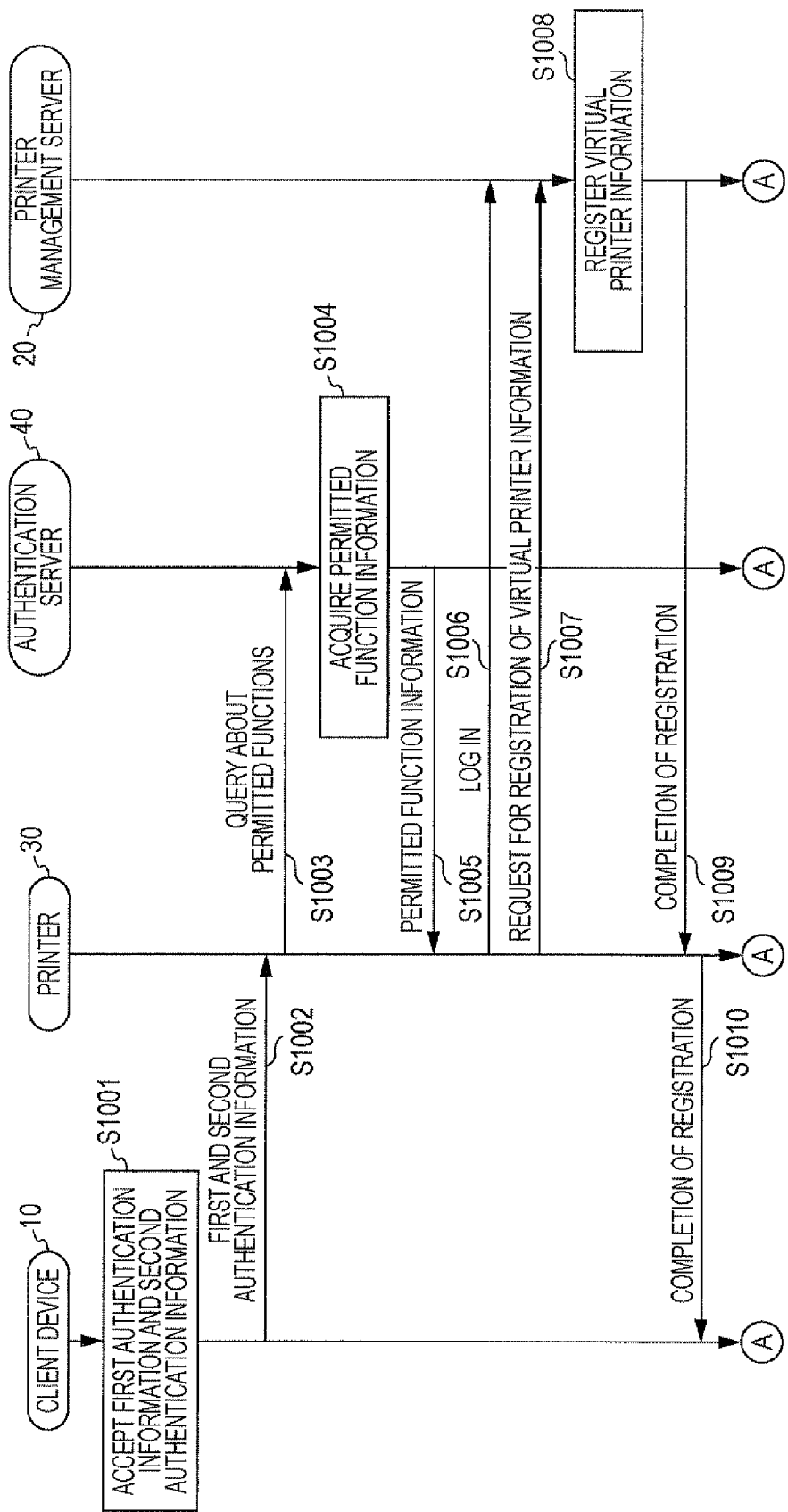

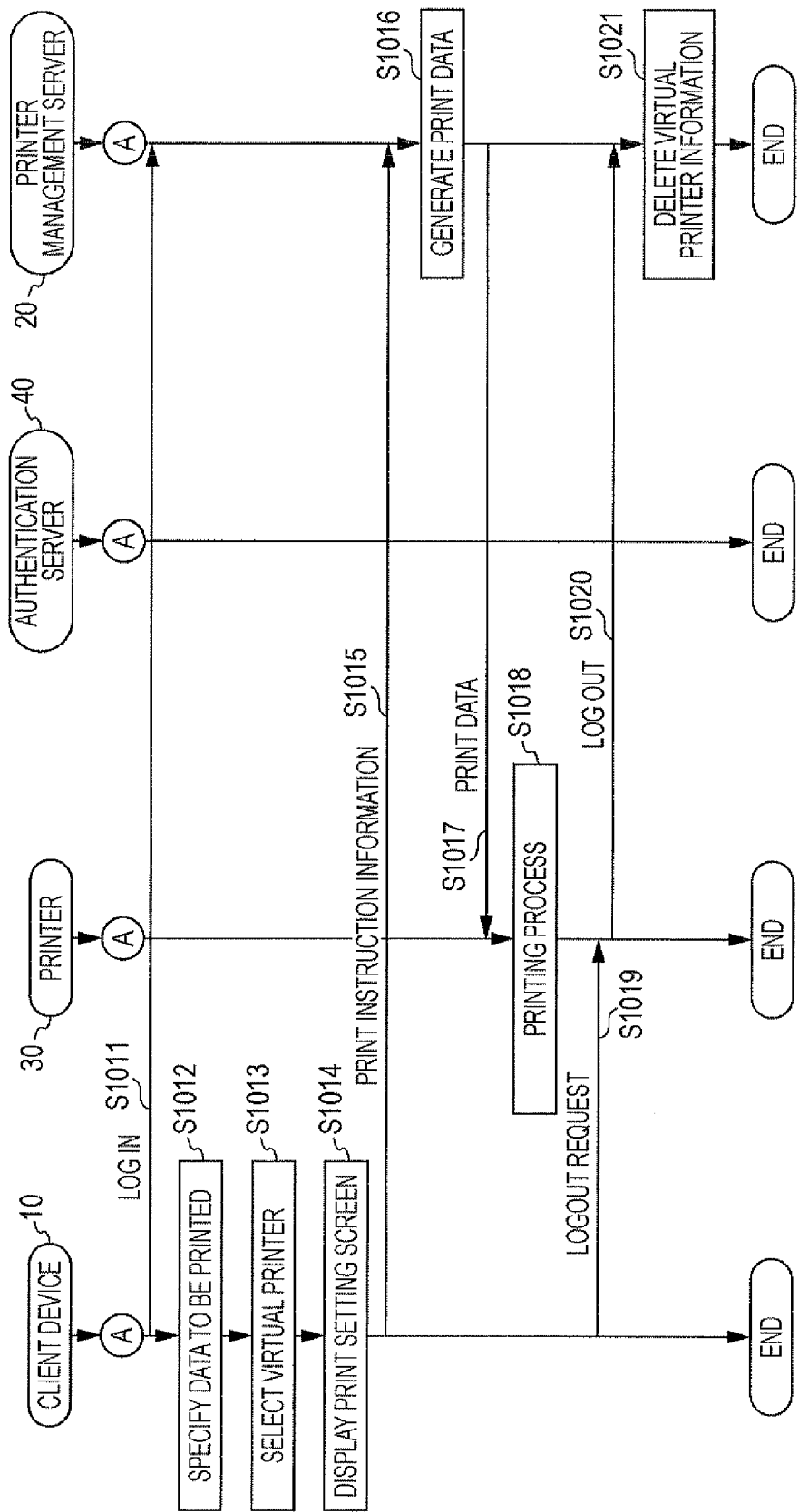

FIG. 4

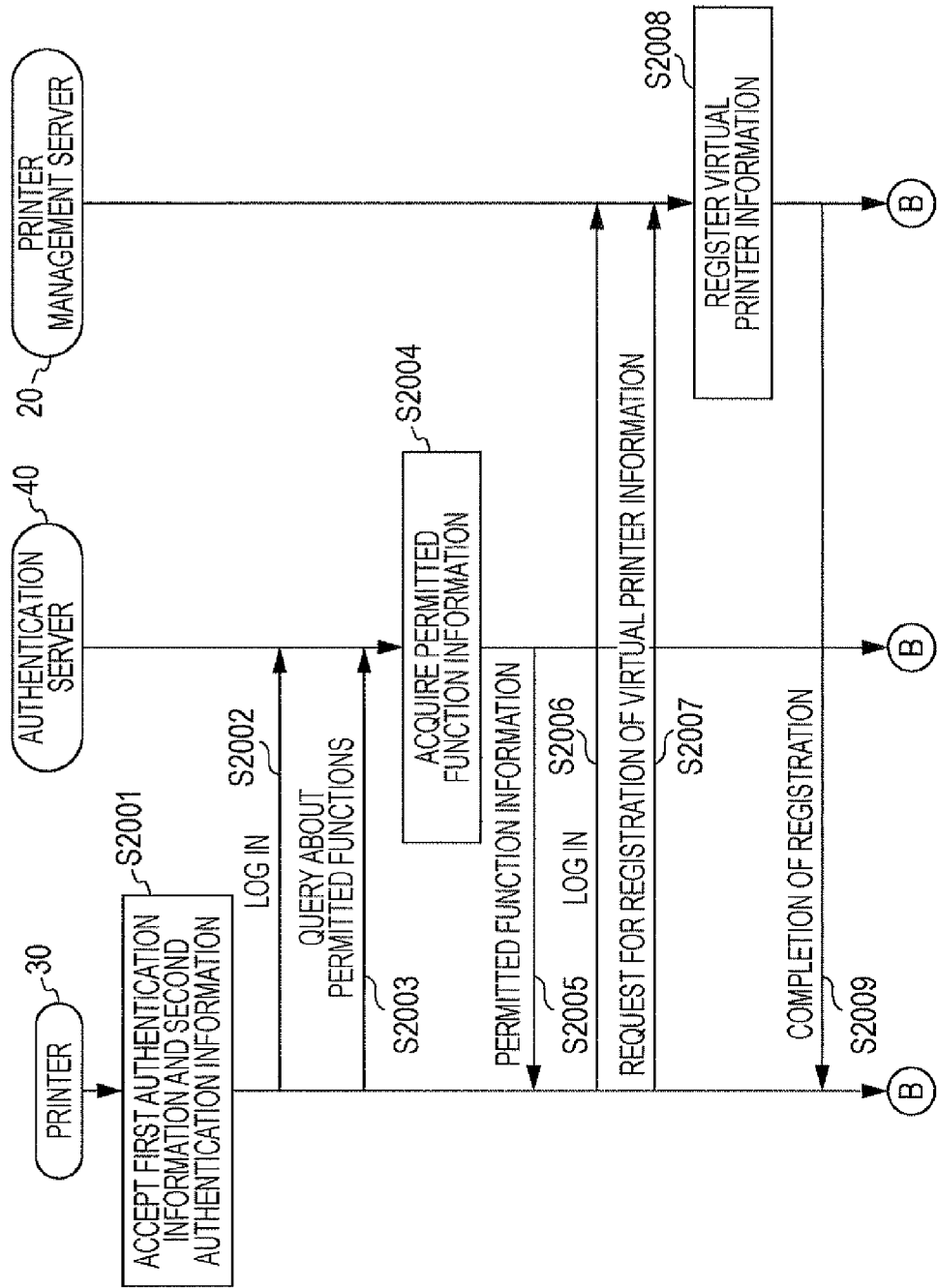

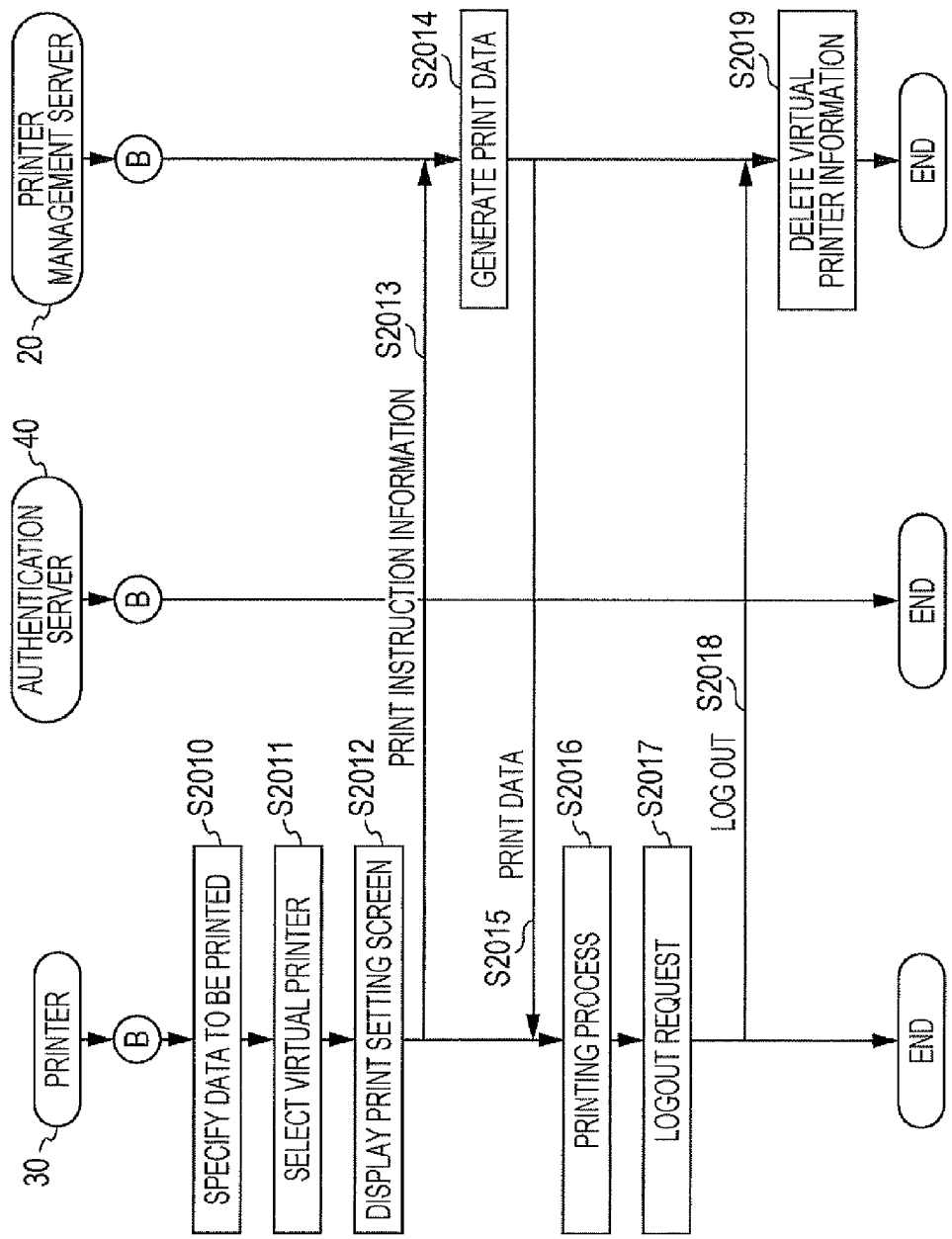

FIG. 8

| USER ID | PRINTER ID | DOUBLE-SIDED PRINTING | COLOR PRINTING | STAPLE | HOLE PUNCH |
|---|---|---|---|---|---|
| U0001 | P0001 | NOT PERMITTED | PERMITTED | PERMITTED | PERMITTED |
| | P0002 | PERMITTED | PERMITTED | PERMITTED | PERMITTED |
| | P0003 | NOT PERMITTED | NOT PERMITTED | NOT PERMITTED | NOT PERMITTED |
| U0002 | P0001 | PERMITTED | PERMITTED | NOT PERMITTED | PERMITTED |
| | P0002 | NOT PERMITTED | PERMITTED | PERMITTED | PERMITTED |
| | P0003 | PERMITTED | PERMITTED | PERMITTED | PERMITTED |

FIG. 10

PRINTER SELECTION SCREEN

PRINTER LIST

☑ P0001 ( PERMITTED: "COLOR PRINTING", "STAPLE", "HOLE PUNCH"
NOT PERMITTED: "DOUBLE-SIDED PRINTING" )

☐ P0002 ( PERMITTED: "DOUBLE-SIDED PRINTING", "COLOR PRINTING",
"STAPLE", "HOLE PUNCH"
NOT PERMITTED: )

☐ P0003 ( PERMITTED:
NOT PERMITTED: "DOUBLE-SIDED PRINTING", "COLOR PRINTING",
"STAPLE", "HOLE PUNCH" )

SELECT    CANCEL

INFORMATION PROCESSING SYSTEM, REGISTRATION DEVICE, AND COMPUTER READABLE MEDIUM FOR IDENTIFYING A USER OF A PRINTER

CROSS-REFERENCE TO RELATED APPLICATIONS

This application is based on and claims priority under 35 USC 119 from Japanese Patent Application No. 2011-204660 filed Sep. 20, 2011.

BACKGROUND (i) Technical Field

The present invention relates to information processing systems, registration devices, and computer readable media.

(ii) Related Art

Typical printers have multiple functions. For such printers, it may be desired to restrict available functions depending on the user.

SUMMARY

According to an aspect of the invention, there is provided an information processing system including a first management device that manages, for each user, information on a function of a printer that the user is permitted to use in the printer; a second management device that accepts registration of a virtual printer corresponding to a set of a printer and a function to be used in the printer, and that manages the registered virtual printer; and a registration device that registers a virtual printer in the second management device. The registration device includes an identification unit that identifies a user and a printer that are related to a print request, an acquisition unit that acquires information on a function that the identified user is permitted to use in the identified printer, from the first management device, and a registration unit that registers a virtual printer corresponding to a set of the identified printer and the function indicated by the information that has been acquired by the acquisition unit, in the second management device in association with the identified user. The second management device includes a processing unit that processes, upon receiving from the identified user a print instruction in which the virtual printer registered in association with the identified user is specified, the print instruction on the basis of the set of the printer and the function corresponding to the specified virtual printer.

BRIEF DESCRIPTION OF THE DRAWINGS

Exemplary embodiment(s) of the present invention will be described in detail based on the following figures, wherein:

FIG. 2 is a diagram illustrating an example of use right information;

FIGS. 3A and 3B are sequence diagrams describing a flow of a process performed in the printing system according to the first exemplary embodiment;

FIG. 4 is a diagram illustrating an example of a print setting screen;

FIGS. 6A and 6B are sequence diagrams describing a flow of a process performed in the printing system according to the second exemplary embodiment;

FIG. 10 is a diagram illustrating an example of a printer selection screen.

DETAILED DESCRIPTION

Exemplary embodiments for carrying out the present invention (hereinafter, simply referred to as exemplary embodiments) will be described below in accordance with the accompanying drawings.

First Exemplary Embodiment

Figure 1:
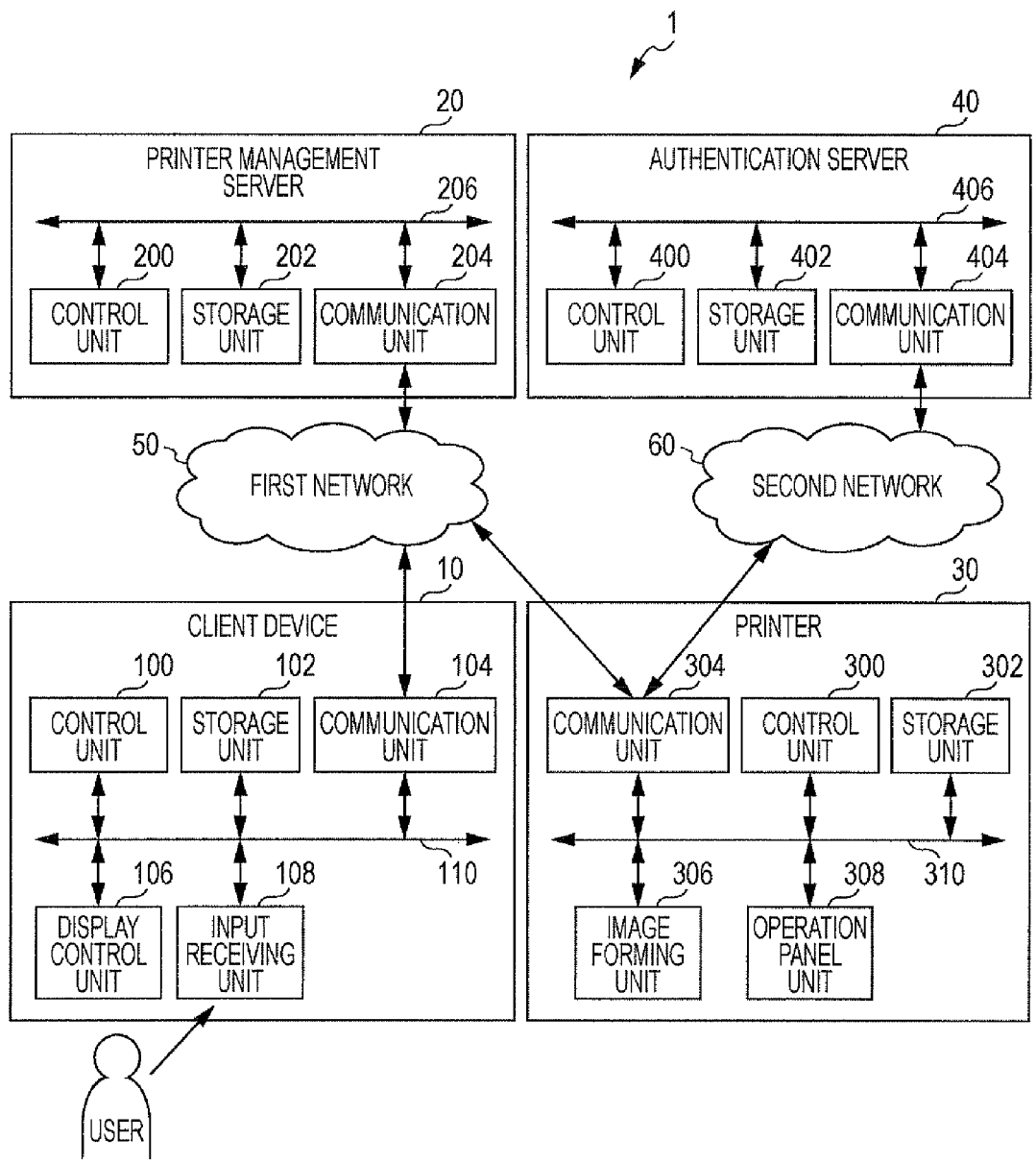
FIG. 1 is a system configuration diagram of a printing system according to a first exemplary embodiment.

FIG. 1 illustrates a system configuration diagram of a printing system 1 according to a first exemplary embodiment of the present invention. As illustrated in FIG. 1, the printing system 1 according to the first exemplary embodiment includes a client device 10, a printer management server 20, a printer 30, and an authentication server 40. The client device 10, the printer management server 20, and the printer 30 are connected to each other via a first network 50, such as the Internet, so that data communication is performable therebetween. The printer 30 and the authentication server 40 are connected to each other via a second network 60, such as a local area network, so that data communication is performable therebetween.

The client device 10 is a computer operated by a user. FIG. 1 illustrates an example of a configuration of the client device 10. As illustrated in FIG. 1, the client device 10 includes a control unit 100, a storage unit 102, a communication unit 104, a display control unit 106, and an input receiving unit 108, which perform data communication with each other via a bus 110.

The control unit 100 includes a central processing unit (CPU). The control unit 100 performs various kinds of processing and controls each unit of the client device 10 on the basis of programs stored in the storage unit 102.

The storage unit 102 stores control programs such as an operating system of the client device 10, application programs such as a web browser, and data. The storage unit 102 is also used as a work memory of the control unit 100. The programs may be supplied to the client device 10 after being stored on an information storage medium, such as an optical disc, a magnetic disk, a magnetic tape, a magneto-optical disk, or a flash memory, or may be supplied to the client device 10 via a data communication medium, such as the Internet.

The communication unit 104 includes a network card. The communication unit 104 is connected to the first network 50 via the network card, and performs data communication with other devices (e.g., the printer management server 20 and the printer 30) connected to the first network 50.

The display control unit 106 is connected to a display device, such as a liquid crystal display included in or externally connected to the client device 10, and causes the display device to display (screens of) results of information processing performed in the client device 10.

The input receiving unit 108 is connected to input devices, such as a keyboard, a mouse, and a touch panel, and accepts information input by a user from the input devices.

The printer management server 20 is a computer that manages, for each user account information, information on a virtual printer (logical printer) registered by the user, and that generates print data (print job) on the basis of a print instruction received from the client device 10 and sends the print data to the (physical) printer 30 corresponding to the virtual printer to cause the printer 30 to perform a printing process. Meanwhile, the user account information managed by the printer management server 20 is referred to as a cloud user ID. Additionally, in this exemplary embodiment, a virtual printer indicates logical printer information in which a printer driver of the printer 30, address information of the printer 30, model information of the printer 30, and a list of functions available in the printer 30 are associated.

FIG. 1 illustrates an example of a configuration of the printer management server 20. As illustrated in FIG. 1, the printer management server 20 includes a control unit 200, a storage unit 202, and a communication unit 204, which perform data communication with each other via a bus 206.

The control unit 200 includes a CPU. The control unit 200 performs various kinds of processing and controls each unit of the printer management server 20 on the basis of programs stored in the storage unit 202.

The storage unit 202 stores control programs such as an operating system of the printer management server 20 and data. The storage unit 202 is also used as a work memory of the control unit 200. The programs may be supplied to the printer management server 20 after being stored on an information storage medium, such as an optical disc, a magnetic disk, a magnetic tape, a magneto-optical disk, or a flash memory, or may be supplied to the printer management server 20 via a data communication medium, such as the Internet.

The storage unit 202 may store, for each user account information (cloud user ID), information on a virtual printer (logical printer) registered by the user in association with data to be printed (such as document data processed by an application program and print job data) held by the user.

The communication unit 204 includes a network card. The communication unit 204 is connected to the first network 50 via the network card, and performs data communication with other devices (e.g., the client device 10 and the printer 30) connected to the first network 50.

The printer 30 is an image forming apparatus having a communication function and multiple functions regarding printing processes. FIG. 1 illustrates an example of a configuration of the printer 30. As illustrated in FIG. 1, the printer 30 includes a control unit 300, a storage unit 302, a communication unit 304, an image forming unit 306, and an operation panel unit 308, which perform data communication with each other via a bus 310.

The control unit 300 includes a CPU. The control unit 300 performs various kinds of processing and controls each unit of the printer 30 on the basis of programs stored in the storage unit 302.

The storage unit 302 stores control programs of the printer 30 and data, and is also used as a work memory of the control unit 300. The programs may be supplied to the printer 30 after being stored on an information storage medium, such as an optical disc, a magnetic disk, a magnetic tape, a magneto-optical disk, or a flash memory, or may be supplied to the printer 30 via a data communication medium, such as the Internet.

The communication unit 304 includes a network card. The communication unit 304 is connected to the first network 50 via the network card, and performs data communication with other devices (e.g., the client device 10 and the printer management server 20) connected to the first network 50. The communication unit 304 is also connected to the second network 60, and performs data communication with other devices (e.g., the authentication server 40) connected to the second network 60.

The image forming unit 306 forms an image on a print medium in accordance with an image formation instruction (print job) input from the control unit 300. For example, the image forming unit 306 may form an image using the method of laser printers, or may form an image using the method of inkjet printers. In this exemplary embodiment, it is assumed that the image forming unit 306 has multiple printing functions, such as a single-sided/double-sided printing function (double-sided printing), a color/monochrome printing function (color printing), a stapling function (staple), and a hole-punching function (hole punch).

The operation panel unit 308 is a display-function-attached input device that includes a display device, such as a liquid crystal display, and an input device realized with buttons, a touch panel, and the like. The operation panel unit 308 functions as an interactive interface to a user who operates the printer 30.

The authentication server 40 is a computer that manages information on a function that each user is permitted to use among functions of the printer 30, in association with user account information. Meanwhile, the user account information managed by the authentication server 40 is referred to as a local user ID.

FIG. 1 illustrates an example of a configuration of the authentication server 40. As illustrated in FIG. 1, the authentication server 40 includes a control unit 400, a storage unit 402, and a communication unit 404, which perform data communication with each other via a bus 406.

The control unit 400 includes a CPU. The control unit 400 performs various kinds of processing and controls each unit of the authentication server 40 on the basis of programs stored in the storage unit 402.

The storage unit 402 stores control programs such as an operating system of the authentication server 40, and data. The storage unit 402 is also used as a work memory of the control unit 400. The programs may be supplied to the authentication server 40 after being stored on an information storage medium, such as an optical disc, a magnetic disk, a magnetic tape, a magneto-optical disk, or a flash memory, or may be supplied to the authentication server 40 via a data communication medium, such as the Internet.

FIG. 2 illustrates an example of use right information of use rights granted to each user, stored in the storage unit 402. In the use right information illustrated in FIG. 2, information on whether or not use of the double-sided printing function, the color printing function, the stapling function, and the hole-punching function is permitted is stored in association with each user ID (local user ID) for identifying a user.

The communication unit 404 includes a network card. The communication unit 404 is connected to the second network 60 via the network card, and performs data communication with other devices (e.g., the printer 30) connected to the second network 60.

A flow of a process performed in the printing system 1 according to the first exemplary embodiment will now be described with reference to sequence diagrams illustrated in FIGS. 3A and 3B. Meanwhile, in the printing system 1 according to the first exemplary embodiment, it is assumed that the printer 30 functions as a registration device that registers a virtual printer to be used for a printing process by a user in the printer management server 20.

As illustrated in FIG. 3A, the client device 10 accepts input of first authentication information (e.g., a local user ID and a password) for logging into the authentication server 40 and second authentication information (e.g., a cloud user ID and a password) for logging into the printer management server 20 from a user (S1001). The client device 10 then sends the accepted first and second authentication information to the printer 30 (S1002).

The printer 30 queries the authentication server 40 about printing functions that a user identified from the local user ID is permitted to use, by using the first authentication information (the local user ID and the password) received from the client device 10 (S1003).

The authentication server 40 acquires information (permitted function information) on functions stored in association with the local user ID included in the first authentication information, with reference to the use right information stored in the storage unit 402 (S1004). The authentication server 40 then sends the acquired permitted function information to the printer 30 (S1005).

The printer 30 logs into the printer management server 20 using the second authentication information (the cloud user ID and the password) received from the client device 10 (S1006). The printer 30 also requests the printer management server 20 to register virtual printer information in which functions to be used in the printer 30 are set on the basis of the permitted function information received from the client device 10 (S1007).

The printer management server 20 registers the virtual printer information received from the printer 30 in association with the cloud user ID (S1008). After registering the virtual printer information, the printer management server 20 notifies the printer 30 of completion of registration of the virtual printer information (S1009). Upon receiving the notification from the printer management server 20, the printer 30 notifies the client device 10 of completion of registration (S1010).

Figure 4:
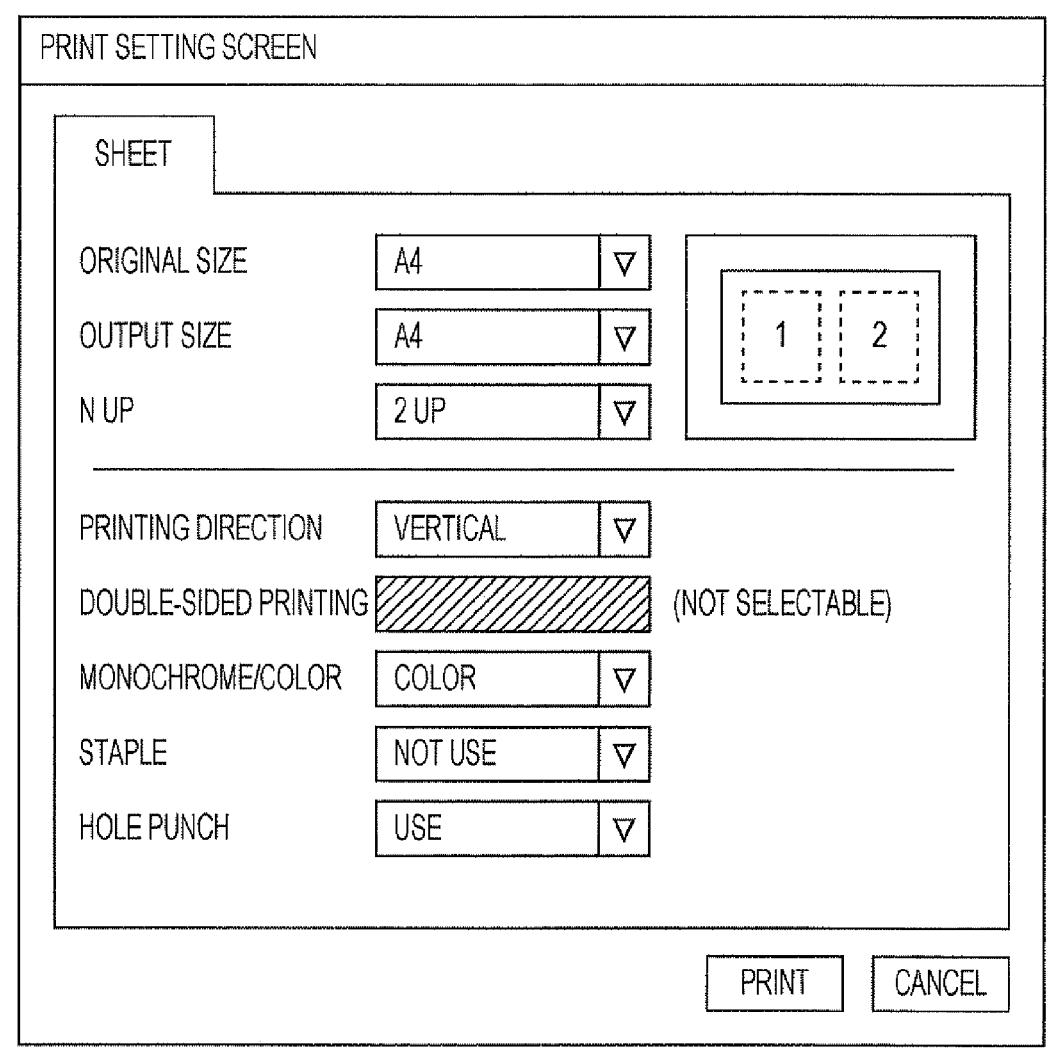

Subsequently, as illustrated in FIG. 3B, the client device 10 logs into the printer management server 20 using the second authentication information (the cloud user ID and the password) (S1011). The client device 10 accepts, from the user, specification of data to be printed from among data that is stored in the client device 10 or the printer management server 20 in association with the user (S1012). Once the virtual printer registered in association with the cloud user ID is selected as an output-destination printer (S1013), the client device 10 displays a print setting screen regarding the selected virtual printer (see, for example, FIG. 4) (S1014). As illustrated in FIG. 4, the print setting screen is displayed on the basis of the permitted function information specified in the selected virtual printer information, and only printing parameters of functions that the user is permitted to use are specifiable thereon.

Once a "PRINT" button is pushed on the print setting screen, the client device 10 sends, to the printer management server 20, print instruction information generated on the basis of the output-destination virtual printer, the to-be-printed data specified in step S1012, and print setting information that has been generated on the basis of information input on the print setting screen (S1015).

On the basis of the print instruction information received from the client device 10, the printer management server 20 generates print data (print job) having an output format compatible with the output-destination virtual printer (S1016). For example, the printer management server 20 may convert first print data having a format generated by the client device 10 into second print data having a format compatible with the output-destination printer 30, thereby generating the print data (print job). The printer management server 20 then sends the print data generated in step S1016 to the output-destination printer 30 (S1017).

The printer 30 performs a printing process on the basis of the print data received from the printer management server 20 (S1018).

In response to a logout (authentication cancel) request received from the client device 10 (S1019), the printer 30 logs the user out from the printer management server 20 (S1020). Thereafter, the printer management server 20 deletes the virtual printer information registered in association with the cloud user ID of the user who had logged in (S1021). The process then ends.

In the printing system 1 according to the first exemplary embodiment, the authentication server 40 in which available printing functions are defined for each user and the printer management server 20 that manages virtual printers are independent from each other and do not operate in cooperation with each other. Even in such a case, when the printer 30 to be used in printing by the user is registered as a virtual printer in the printer management server 20, functions that are available in the virtual printer may be set on the basis of functions permitted to the user in the authentication server 40. Furthermore, when the printer management server 20 is configured to delete a corresponding virtual printer after the printer 30 logs the user out from the printer management server 20, virtual printers registered in the printer management server 20 may be kept updated to correspond to the latest use rights of users.

Additionally, in the above exemplary embodiment, the authentication server 40 holds the use right information of users and the printer 30 acquires the use right information from the authentication server 40. However, the printer 30 may hold the use right information.

Second Exemplary Embodiment

A printing system 1 according to a second exemplary embodiment of the present invention will now be described. The printing system 1 according to the second exemplary embodiment differs from the printing system 1 according to the first exemplary embodiment in that a printer 30 accepts input directly from a user via an operation panel unit 308, registers a virtual printer in a printer management server 20, and gives a print instruction to the printer management server 20. Details about the printing system 1 according to the second exemplary embodiment will be described below.

Figure 5:
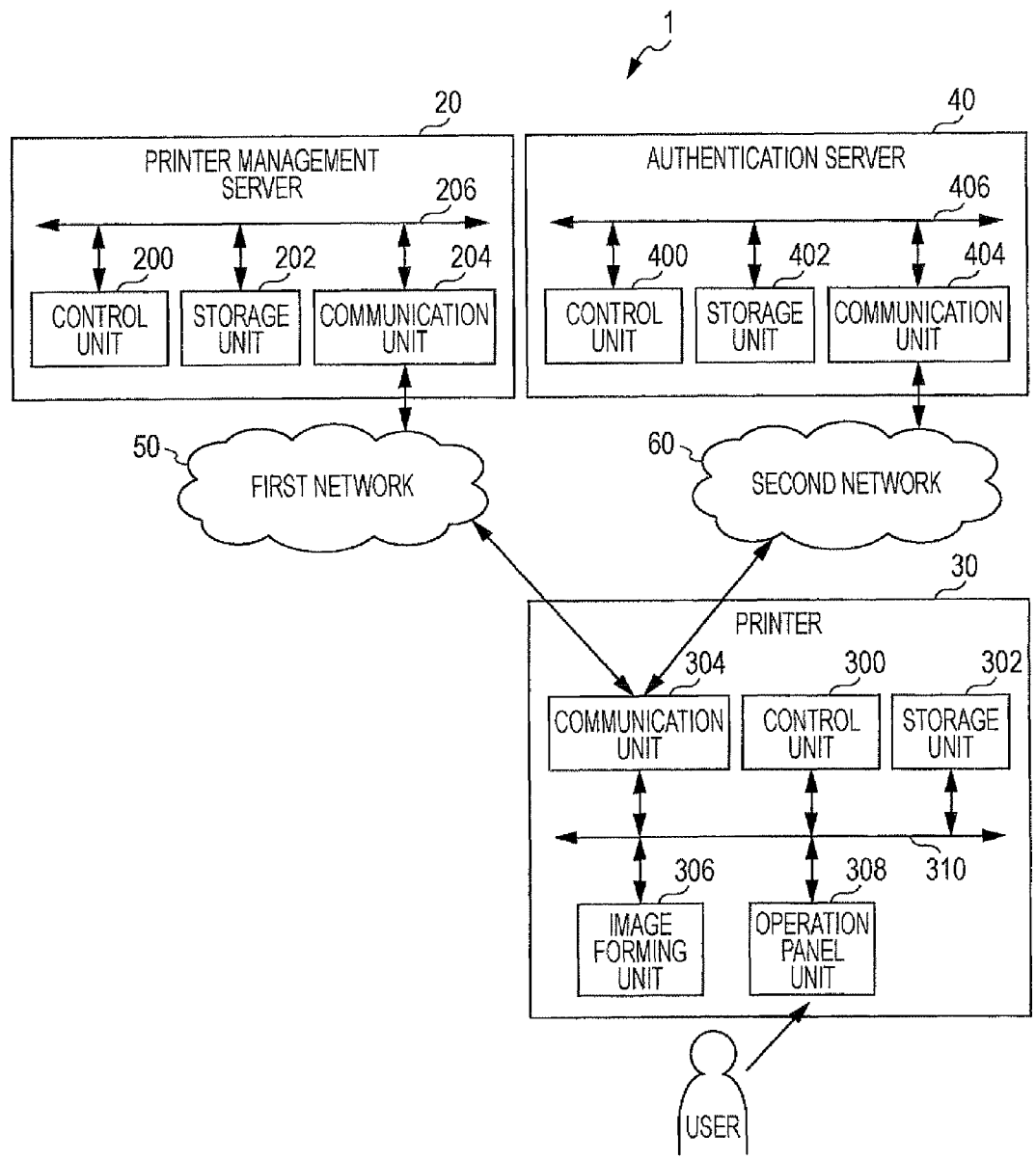
FIG. 5 is a system configuration diagram of a printing system according to a second exemplary embodiment.

FIG. 5 illustrates a system configuration diagram of the printing system 1 according to the second exemplary embodiment. As illustrated in FIG. 5, the printing system 1 according to the second exemplary embodiment includes the printer management server 20, the printer 30, and an authentication server 40. The printer management server 20 and the printer 30 are connected to each other via a first network 50, such as the Internet, so that data communication is performable therebetween. The printer 30 and the authentication server 40 are connected to each other via a second network 60, such as a local area network, so that data communication is performable therebetween. Since the hardware configurations of the printer management server 20, the printer 30, and the authentication server 40 are the same as those described in the first exemplary embodiment, the description thereof is omitted.

A flow of a process performed in the printing system 1 according to the second exemplary embodiment will now be described with reference to sequence diagrams illustrated in FIGS. 6A and 6B. As in the first exemplary embodiment, in the printing system 1 according to the second exemplary embodiment, it is also assumed that the printer 30 functions as a registration device that registers a virtual printer to be used for a printing process by a user in the printer management server 20.

As illustrated in FIG. 6A, the printer 30 accepts input of first authentication information (e.g., a local user ID and a password) for logging into the authentication server 40 and second authentication information (e.g., a cloud user ID and a password) for logging into the printer management server 20 from a user via the operation panel unit 308 (S2001).

The printer 30 logs into the authentication server 40 using the first authentication information (the local user ID and the password) accepted in step S2001 (S2002). The printer 30 then queries the authentication server 40 about printing functions that a user identified from the local user ID is permitted to use (S2003).

The authentication server 40 acquires information (permitted function information) on functions stored in association with the local user ID included in the first authentication information, with reference to use right information stored in the storage unit 402 (S2004). The authentication server 40 then sends the acquired permitted function information to the printer 30 (S2005).

The printer 30 logs into the printer management server 20 using the second authentication information (the cloud user ID and the password) accepted in step S2001 (S2006). The printer 30 also requests the printer management server 20 to register virtual printer information in which functions to be used in the printer 30 are set on the basis of the permitted function information that has been sent in step S2005 (S2007).

The printer management server 20 registers the virtual printer information received from the printer 30 in association with the cloud user ID (S2008). After registering the virtual printer information, the printer management server 20 notifies the printer 30 of completion of registration of the virtual printer information (S2009).

Subsequently, as illustrated in FIG. 6B, the printer 30 accepts, from the user, specification of data to be printed from among data that is stored in the printer 30 or the printer management server 20 in association with the user (S2010). Upon accepting, from the user, selection of the virtual printer information registered in association with the cloud user ID as an output-destination printer (S2011), the printer 30 displays a print setting screen regarding the selected virtual printer information (see, for example, FIG. 4) (S2012). The print setting screen is displayed on the basis of the permitted function information specified in the virtual printer information, and only printing parameters of functions that the user is permitted to use are specifiable thereon.

Once a "PRINT" button is pushed on the print setting screen, the printer 30 sends, to the printer management server 20, print instruction information generated on the basis of the virtual printer information of the output destination, the to-be-printed data specified in step S2010, and print setting information that has been generated on the basis of information input on the print setting screen (S2013).

On the basis of the print instruction information received from the printer 30, the printer management server 20 generates print data (print job) having an output format compatible with the virtual printer information of the output destination (S2014). The printer management server 20 then sends the print data generated in step S2014 to the output-destination printer 30 (S2015).

The printer 30 performs a printing process on the basis of the print data received from the printer management server 20 (S2016).

Upon accepting, from the user, a logout (authentication cancel) request for logging out from the printer management server 20 (S2017), the printer 30 logs the user out from the printer management server 20 (S2018). The printer management server 20 then deletes the virtual printer information registered in association with the cloud user ID of the user who had logged in (S2019). The process then ends.

In the printing system 1 according to the second exemplary embodiment, the printer 30 to be used in printing by a user registers a virtual printer based on use rights of the user in the printer management server 20, and printing may be performed by specifying the registered virtual printer. Also in the second exemplary embodiment, the authentication server 40 may be omitted and the printer 30 may hold the use right information.

Third Exemplary Embodiment

A printing system 1 according a third exemplary embodiment of the present invention will now be described. The printing system 1 according to the third exemplary embodiment differs from the printing system 1 according to the first exemplary embodiment in that an authentication server 40 accepts information from a client device 10, registers a virtual printer in a printer management server 20, and gives a print instruction to the printer management server 20. Details about the printing system 1 according to the third exemplary embodiment will be described below.

Figure 7:
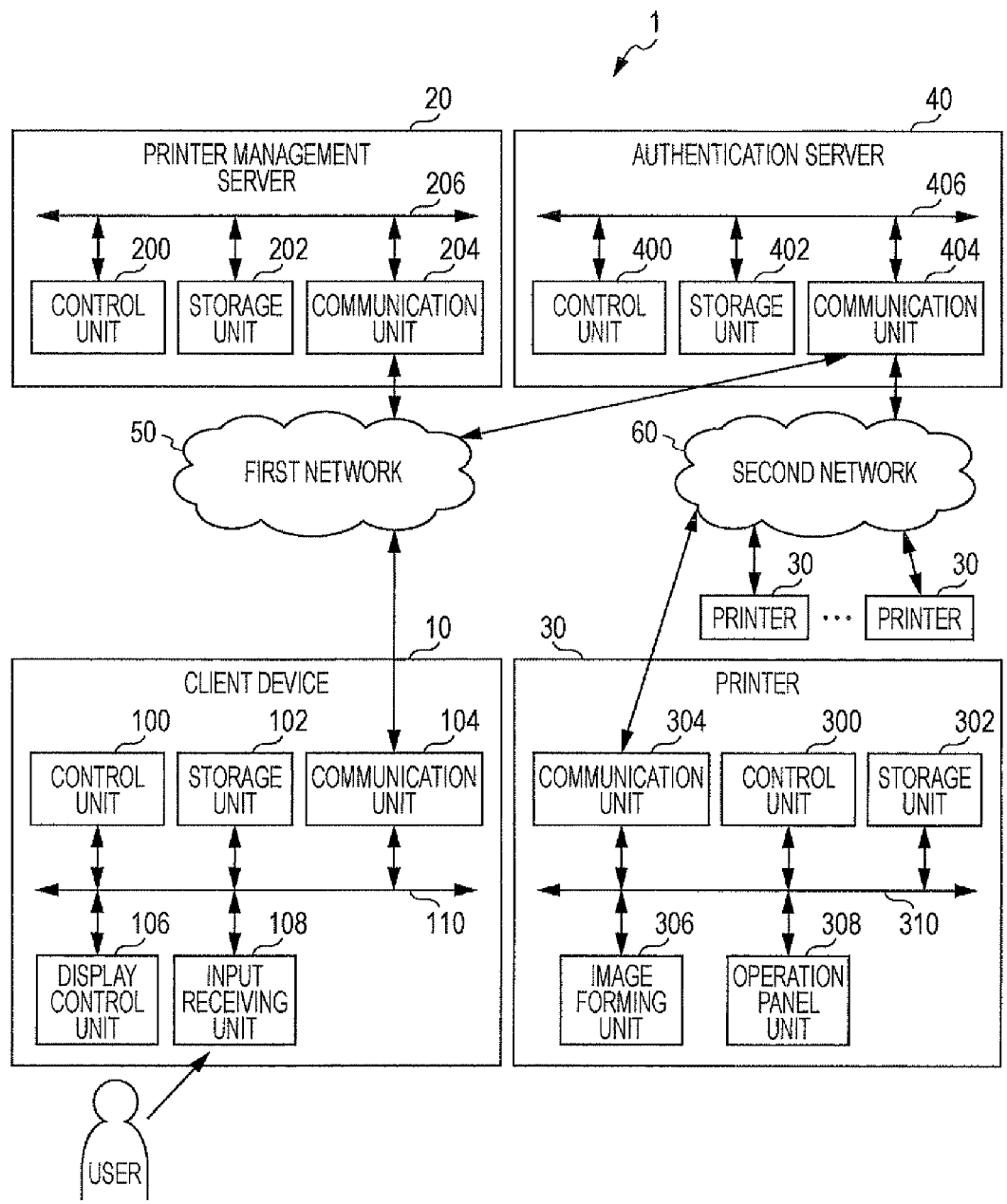
FIG. 7 is a system configuration diagram of a printing system according to a third exemplary embodiment.

FIG. 7 illustrates a system configuration diagram of the printing system 1 according to the third exemplary embodiment. As illustrated in FIG. 7, the printing system 1 according to the third exemplary embodiment includes the client device 10, the printer management server 20, one or more printers 30, and the authentication server 40. The client device 10, the printer management server 20, and the authentication server 40 are connected to each other via a first network 50, such as the Internet, so that data communication is performable therebetween. The one or more printers 30 and the authentication server 40 are connected to each other via a second network 60, such as a local area network, so that data communication is performable therebetween. Meanwhile, the one or more printers 30 may be of different models. In this exemplary embodiment, however, it is assumed that hardware configurations of the printers 30 are the same for simplification. Additionally, since hardware configurations of the client device 10, the printer management server 20, the printers 30, and the authentication server 40 are the same as those described in the first exemplary embodiment, the description thereof is omitted.

Figure 8:
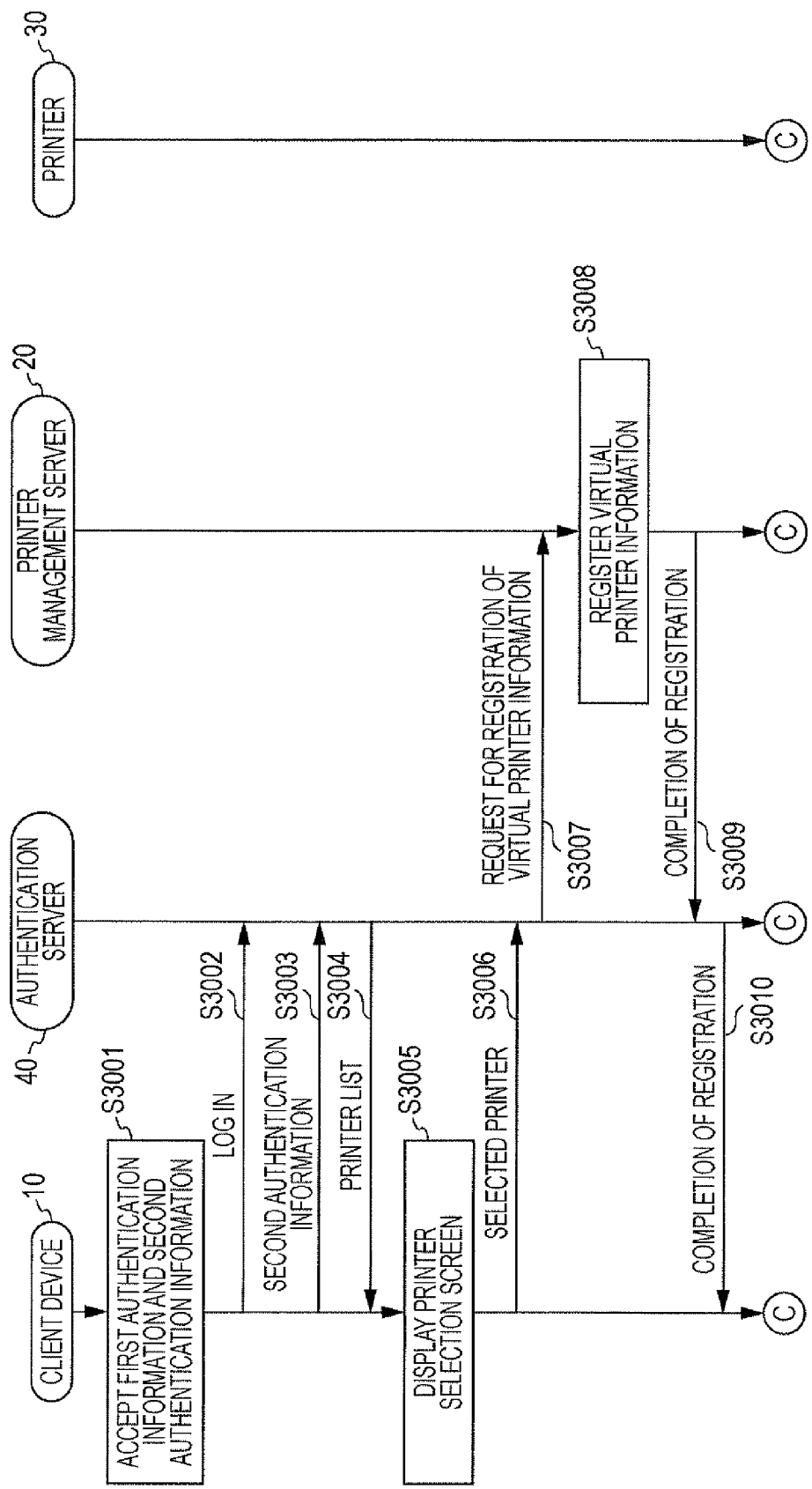
FIG. 8 is a diagram illustrating an example of use right information.

Now, an example of use right information stored in the storage unit 402 of the authentication server 40 according to the third exemplary information will be described. FIG. 8 illustrates an example of the use right information stored in the storage unit 402. In the use right information illustrated in FIG. 8, for each user ID (local user ID) for identifying a user, identification information (printer ID) of each of the one or more printers 30 that the user is permitted to use and information on whether or not the user is permitted to use functions of the printer 30 are stored.

Now, a flow of a process performed in the printing system 1 according to the third exemplary embodiment will be described with reference to sequence diagrams illustrated in FIGS. 9A and 9B. Meanwhile, in the printing system 1 according to the third exemplary embodiment, the authentication server 40 functions as a registration device that registers a virtual printer in the printer management server 20.

Figure 9:
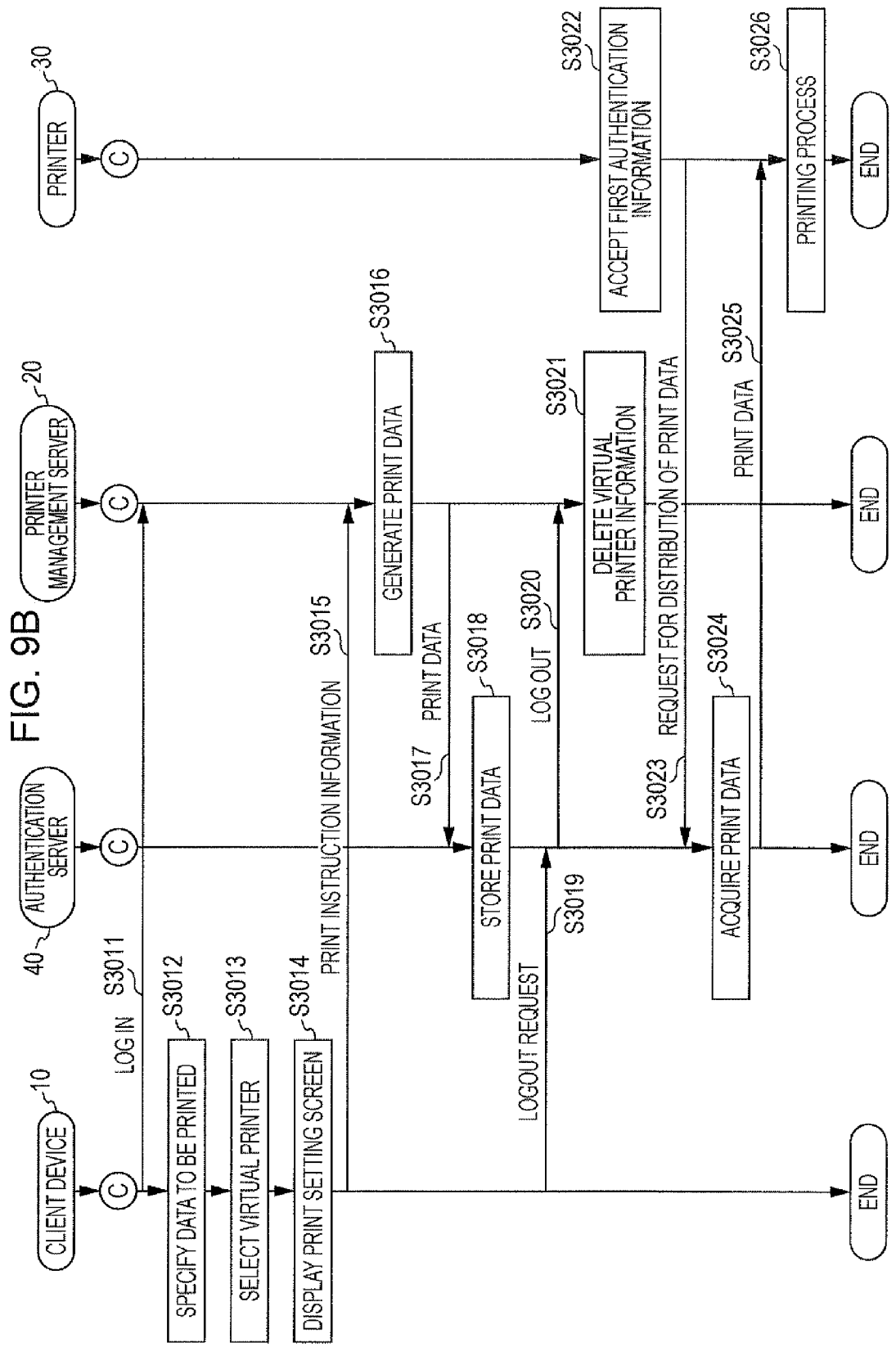
FIGS. 9A and 9B are sequence diagrams describing a flow of a process performed in the printing system according to the third exemplary embodiment.

As illustrated in FIG. 9A, the client device 10 accepts, from a user, input of first authentication information (e.g., a local user ID and a password) for logging into the authentication server 40 and second authentication information (e.g., a cloud user ID and a password) for logging into the printer management server 20 (S3001). After logging into the authentication server 40 using the first authentication information (S3002), the client device 10 sends the second authentication information to the authentication server 40 (S3003).

The authentication server 40 then sends, to the client device 10, printer list information of printers stored in association with the local user ID (S3004). The printer list information may include information on functions that the user is permitted to use in each of the listed printers 30.

The client device 10 displays a printer selection screen (see FIG. 10) on the basis of the printer list information received from the authentication server 40 (S3005). As illustrated in FIG. 10, check boxes for selecting the printers 30 and information on functions that the user is permitted to use in each of the printers 30 are displayed on the printer selection screen.

The client device 10 notifies the authentication server 40 of information on the printer 30 that has been selected on the printer selection screen (S3006). The authentication server 40 requests the printer management server 20 to register virtual printer information that is set on the basis of the notified printer 30 and the functions that the user having the local user ID is permitted to use in the selected printer 30 (S3007).

The printer management server 20 registers the virtual printer information received from the authentication server 40 in association with the cloud user ID (S3008). After registering the virtual printer information, the printer management server 20 notifies the authentication server 40 of completion of registration of the virtual printer information (S3009). Upon receiving the notification from the printer management server 20, the authentication server 40 notifies the client device 10 of completion of registration (S3010).

Subsequently, as illustrated in FIG. 9B, the client device 10 logs into the printer management server 20 using the second authentication information (the cloud user ID and the password) (S3011). The client device 10 accepts, from the user, specification of data to be printed from among data that is stored in the client device 10 or the printer management server 20 in association with the user (S3012). Once the virtual printer information registered in association with the cloud user ID is selected as an output-destination printer (S3013), the client device 10 displays a print setting screen regarding the selected virtual printer information (see, for example, FIG. 4) (S3014). The print setting screen is displayed on the basis of the permitted function information specified in the virtual printer information, and only printing parameters of functions that the user is permitted to use are specifiable thereon.

When a "PRINT" button is pushed on the print setting screen, the client device 10 sends, to the printer management server 20, print instruction information generated on the basis of the virtual printer information of the output destination, the to-be-printed data specified in step S3012, and print setting information which has been generated on the basis of information input on the print setting screen (S3015).

On the basis of the print instruction information received from the client device 10, the printer management server 20 generates print data (print job) having an output format compatible with the output-destination virtual printer (S3016). The printer management server 20 then sends the generated print data to the authentication server 40 (S3017). The authentication server 40 stores the print data received from the printer management server 20 in association with the user (local user ID) (S3018).

Upon accepting, from the user, a logout (authentication cancel) request for logging out from the printer management server 20, the client device 10 instructs the authentication server 40 to log the user out (cancel authentication) from the printer management server 20 (S3019). The printer management server 20 receives the logout instruction from the authentication server 40 and performs a logout process (S3020). The printer management server 20 then deletes the virtual printer information registered in association with the cloud user ID of the user who had logged in (S3021).

After the printer 30 accepts input of the first authentication information (including the local user ID and the password) of the user via the operation panel unit 308 (S3022), the printer 30 logs into the authentication server 40 using the accepted first authentication information and then requests the authentication server 40 to distribute the print data (S3023).

The authentication server 40 acquires the print data stored in association with the local user ID received from the printer 30 (S3024), and sends the acquired print data to the printer 30 (S3025).

The printer 30 performs a printing process on the basis of the print data received from the authentication server 40 (S3026). The process then ends.

In the printing system 1 according to the third exemplary embodiment, a user selects the printer 30 to be used in printing from among the one or more available printers 30. A virtual printer that is set on the basis of functions that the user is permitted to use in the selected printer 30 is registered in the printer management server 20. By displaying functions that are permitted in the individual printers 30 when the user selects the printer 30, the user may easily select the printer 30 in which the desired function is available. Further, by distributing print data to the printer 30 after the user has input the authentication information to the printer 30, a printed material may be output at a timing desired by the user.

The present invention should not be limited by the above exemplary embodiments. For example, in the first and second exemplary embodiments, print data stored in the printer 30 may also be output after the printer 30 accepts, from the user, an output request to output the print data stored in association with the user.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
 a first management device that manages, for each user, information on a function of a printer that the user is permitted to use in the printer, the first management device being configured to manage different information on some functions that each user is permitted to use among multiple functions of the printer, the first management device connected to a local network;

a second management device that accepts registration of a virtual printer corresponding to a set of a printer and a function to be used in the printer, and that manages the registered virtual printer, the second management device connected to a cloud network;

a client device that accepts, from a user, first authentication information for logging into the first management device and second authentication information for logging into the second management device:

a registration device that registers a virtual printer in the second management device, the registration device being a separate device from the first management device, wherein the registration device includes
an identification unit that receives the first authentication information and the second authentication information from the client device, and identifies a user and a printer that are related to a print request,
an acquisition unit that acquires information, responsive to authentication of the first authentication information, on a function that the identified user is permitted to use in the identified printer, from the first management device, and
a registration unit that registers a virtual printer corresponding to a set of the identified printer and the function indicated by the information that has been acquired by the acquisition unit, in the second management device in association with the second authentication information, and wherein the second management device includes
a processing unit that processes, upon receiving from the identified user a print instruction in which the virtual printer registered in association with the identified user is specified, the print instruction on the basis of the set of the printer and the function corresponding to the specified virtual printer.

2. The information processing system according to claim 1, wherein the second management device further includes
a print data acquisition unit that acquires print data related to the print instruction,
a conversion unit that converts the print data that has been acquired by the print data acquisition unit into print data having a format compatible with the specified virtual printer, and
a print control unit that sends the print data that has been converted by the conversion unit to the printer corresponding to the specified virtual printer, and that performs control so as to cause the printer to perform a printing process.

3. The information processing system according to claim 2, wherein the second management device further includes
a deletion unit that deletes a virtual printer registered in association with a user when cancellation of registration of the virtual printer is requested from the user.

4. The information processing system according to claim 3, wherein the first management device manages, for each combination of a user and a printer, information on a function that the user is permitted to use in the printer.

5. The information processing system according to claim 4, wherein the registration device further includes
a providing unit that provides the user related to the print request with a list of printers that are available to the user,
wherein the identification unit identifies a printer selected from the provided list by the user related to the print request, and
wherein the list includes information on a function that the user related to the print request is permitted to use in each of the printers.

6. The information processing system according to claim 2, wherein the first management device manages, for each combination of a user and a printer, information on a function that the user is permitted to use in the printer.

7. The information processing system according to claim 6, wherein the registration device further includes
a providing unit that provides the user related to the print request with a list of printers that are available to the user,
wherein the identification unit identifies a printer selected from the provided list by the user related to the print request, and
wherein the list includes information on a function that the user related to the print request is permitted to use in each of the printers.

8. The information processing system according to claim 1, wherein the second management device further includes
a deletion unit that deletes a virtual printer registered in association with a user when cancellation of registration of the virtual printer is requested from the user.

9. The information processing system according to claim 8, wherein the first management device manages, for each combination of a user and a printer, information on a function that the user is permitted to use in the printer.

10. The information processing system according to claim 9, wherein the registration device further includes
a providing unit that provides the user related to the print request with a list of printers that are available to the user,
wherein the identification unit identifies a printer selected from the provided list by the user related to the print request, and
wherein the list includes information on a function that the user related to the print request is permitted to use in each of the printers.

11. The information processing system according to claim 1, wherein the first management device manages, for each combination of a user and a printer, information on a function that the user is permitted to use in the printer.

12. The information processing system according to claim 11, wherein the registration device further includes
a providing unit that provides the user related to the print request with a list of printers that are available to the user,
wherein the identification unit identifies a printer selected from the provided list by the user related to the print request, and
wherein the list includes information on a function that the user related to the print request is permitted to use in each of the printers.

13. The information processing system according to claim 1, wherein the user enters at least two separate authentication information to access the printer.

14. A registration device comprising:
an identification unit that receives, from a user, a first authentication information for logging into a device on a local network and a second authentication information for logging onto a cloud network, and identifies a user and a printer that are related to a print request;
an acquisition unit that acquires information, responsive to authentication of the first authentication information, on a function that the identified user is permitted to use in the identified printer, from a holding device that holds, for each user, information on a function of a printer that the user is permitted to use in the printer, wherein the acquisition unit is configured to acquire different information on some functions that each user is permitted to use among multiple functions of the printer; and a registration unit that registers a virtual printer corresponding to a set of the identified printer and the function indicated by the information that has been acquired by the acquisition unit, in association with the second authentication information.

15. A non-transitory computer readable medium storing a program causing a computer to execute a process for registration, the process comprising:

receiving, from a user, a first authentication information for logging onto a device on a local network and a second authentication information for logging onto a cloud network;

identifying a user and a printer that are related to a print request;

acquiring information, responsive to authentication of the first authentication information, on a function that the identified user is permitted to use in the identified printer, from a holding device that holds, for each user, information on a function of a printer that the user is permitted to use in the printer, wherein the information on the function of the printer that the user is permitted to use is configured to be different on some functions that each user is permitted to among multiple functions of the printer; and registering a virtual printer corresponding to a set of the identified printer and the function indicated by the acquired information, in association with second authentication information.

* * * * *